(12) United States Patent
Oh et al.

(10) Patent No.: US 9,860,925 B2
(45) Date of Patent: Jan. 2, 2018

(54) WIRELESS LAN CONNECTION METHOD USING SIGNAL STRENGTH

(71) Applicant: JIRANSOFT Co., Ltd., Daejon (KR)

(72) Inventors: Chi Young Oh, Seoul (KR); Choong Rouk Oh, Gyeonggi-do (KR)

(73) Assignee: JIRANSOFT CO., LTD., Daejon (KR)

( * ) Notice: Subject to any disclaimer, the term of this patent is extended or adjusted under 35 U.S.C. 154(b) by 64 days.

(21) Appl. No.: 14/869,702

(22) Filed: Sep. 29, 2015

(65) Prior Publication Data

US 2016/0227591 A1 Aug. 4, 2016

(30) Foreign Application Priority Data

Feb. 4, 2015 (KR) ........................ 10-2015-0017440

(51) Int. Cl.
| | | |
|---|---|---|
| *H04W 12/10* | (2009.01) | |
| *H04W 76/02* | (2009.01) | |
| *H04W 12/08* | (2009.01) | |
| *H04W 48/20* | (2009.01) | |
| H04W 84/12 | (2009.01) | |

(52) U.S. Cl.
CPC ........... *H04W 76/02* (2013.01); *H04W 12/08* (2013.01); *H04W 48/20* (2013.01); *H04W 84/12* (2013.01)

(58) Field of Classification Search
CPC ..... H04W 76/02; H04W 48/20; H04W 84/12; H04W 12/08
See application file for complete search history.

(56) References Cited

U.S. PATENT DOCUMENTS

2010/0313241 A1* 12/2010 Lee .................. G06F 15/16
726/3

FOREIGN PATENT DOCUMENTS

| JP | 2004-153736 | 5/2004 | | |
|---|---|---|---|---|
| JP | 2006-186616 | 7/2006 | | |
| JP | 2007-135076 | 5/2007 | | |
| JP | 2013 198130 | * 3/2013 | ............ | H04W 12/06 |
| JP | 2013-198130 | 9/2013 | | |
| KR | 1020100131211 | 12/2010 | | |
| KR | 1020110125695 | 11/2011 | | |

* cited by examiner

*Primary Examiner* — Lakeram Jangbahadur
(74) *Attorney, Agent, or Firm* — IP & T Group LLP

(57) ABSTRACT

A wireless LAN connection method using signal strength is provided. The wireless LAN connection method is carried out by an access point, and includes the steps of: measuring wireless signal strength of a signal which is received from a terminal having transmitted a connection request; determining whether the wireless signal strength is equal to or greater than a predetermined threshold; checking whether the terminal is registered in an available list which is information on terminals having had signal strength equal to or greater than the predetermined threshold when the wireless signal strength is less than the predetermined threshold; and permitting connection of the terminal to a wireless LAN only when the terminal is registered in the available list.

2 Claims, 3 Drawing Sheets

WIRELESS LAN CONNECTION METHOD USING SIGNAL STRENGTH

The present application claims priority of Korean Patent Application No. 10-2015-0017440, filed on Feb. 4, 2015, which is incorporated herein by reference in its entirety.

BACKGROUND

Field of the Invention

The present invention relates to wireless LAN connection, and more particularly, to a wireless LAN connection method using a signal strength of a terminal device.

Description of the Related Art

With recent advancement in wireless technology, wired networks used by a lot of users have been replaced with wireless networks. That is, restriction on mobility of a wired network can be solved using wireless technology and thus a lot of techniques using a wireless network have been actively studied. With recent remarkable advancement in information communication technology, semiconductor technology, and the like, various mobile terminals have been rapidly spread and used.

On the other hand, a wireless LAN (Local Area Network) is also referred to as Wi-Fi (Wireless Fidelity) in a sense that a wireless network can be conveniently used like a Hi-Fi (High-Fidelity) audio. Within a predetermined distance from a position at which an access point (AP) is installed, the Internet can be enjoyed using a mobile terminal or a notebook computer.

Particularly, with popularization of mobile terminals, a wireless LAN having prospects as an open wireless network have rapidly spread, and the Wi-Fi is used to provide a fast data service to the whole city such as schools, airports, hotels, and offices.

Mobile terminals supporting the Wi-Fi provide a Wi-Fi protected setup (WPS) function of simply setting wireless connection and security without using complicated settings. That is, Wi-Fi devices provide a function of inputting a specific button which assigned by the WPS function or directly inputting given PIN codes to set a secure connection.

However, in addition to high-performance terminals such as smartphones, terminals accessing an access point and uploading simple information to a specific server or the like using Wi-Fi technology have been spread in recent years. There is a demand for a method of easily setting Wi-Fi connection of a terminal to an access point. In general, when a terminal transmitting and receiving only simple information includes a user input unit and a display unit for only the Wi-Fi connection to an access point, the manufacturing cost thereof increases, thereby causing an increase in consumer price.

In using a wireless LAN, a password may be set for tightening security. Some users using an access point AP such as a router may not know the method of setting a password or may not set a password by considering the method to be troublesome. In this case, unjust users may use resources of the AP. For example, when a password is not set for a household router, a signal of the router may be taken by a neighboring house and may be used without permission.

As an example of the related art, Korean Patent Application Laid-open No. 10-2011-0125695 (Publication Date: Nov. 22, 2011) discloses Wi-Fi service providing method and system for a Wi-Fi device.

SUMMARY OF THE INVENTION

Therefore, the invention is made to solve the above-mentioned problems and an object thereof is to provide a wireless LAN connection method of enabling only a just user to use a wireless LAN using signal strength of a terminal.

Other objects of the invention will become more apparent from the following exemplary embodiments.

According to an aspect of the invention, there are provided a wireless LAN connection method which is carried out by an access point and a recording medium having a program for performing the method recorded thereon, the wireless LAN connection method including the steps of: measuring wireless signal strength of a signal which is received from a terminal having transmitted a connection request; determining whether the wireless signal strength is equal to or greater than a predetermined threshold; checking whether the terminal is registered in an available list which is information on terminals having had signal strength equal to or greater than the predetermined threshold when the wireless signal strength is less than the predetermined threshold; and permitting connection of the terminal to a wireless LAN only when the terminal is registered in the available list.

Here, the available list may be periodically reconfigured based on a predetermined rule.

According to another aspect of the invention, there are provided a wireless LAN connection method which is carried out by an access point and a recording medium having a program for performing the method recorded thereon, the wireless LAN connection method including the steps of: storing and holding an available list which is information on terminals having had signal strength equal to or greater than a predetermined threshold; determining whether a terminal having transmitted a connection request is registered in the available list; and forbidding connection of the terminal to a wireless LAN when the terminal is not registered in the available list and the wireless signal strength of a signal received from the terminal is less than the predetermined threshold.

According to still another aspect of the invention, there are provided a wireless LAN connection method which is carried out by an access point and a recording medium having a program for performing the method recorded thereon, the wireless LAN connection method including the steps of: measuring wireless signal strength of a signal which is received from a terminal having no authentication information for connection when a connection request is received from the terminal; and supplying the authentication information to the terminal when the wireless signal strength is equal to or greater than a predetermined threshold, wherein the terminal tries connection using the authentication information later.

Here, the authentication information may be periodically changed based on a predetermined rule.

Main authentication information and auxiliary authentication information which is periodically changed may be managed as the authentication information, and the authentication information supplied to the terminal may be the auxiliary authentication information.

According to the above-mentioned configurations of the invention, it is possible to keep security without using authentication information such as a password and to permit connection of only a specific terminal.

According to the above-mentioned configurations of the invention, if is possible to solve inconvenience that a user of a terminal should memorize and input a password even when the password is set.

DESCRIPTION OF EXEMPLARY EMBODIMENTS

Figure 1:
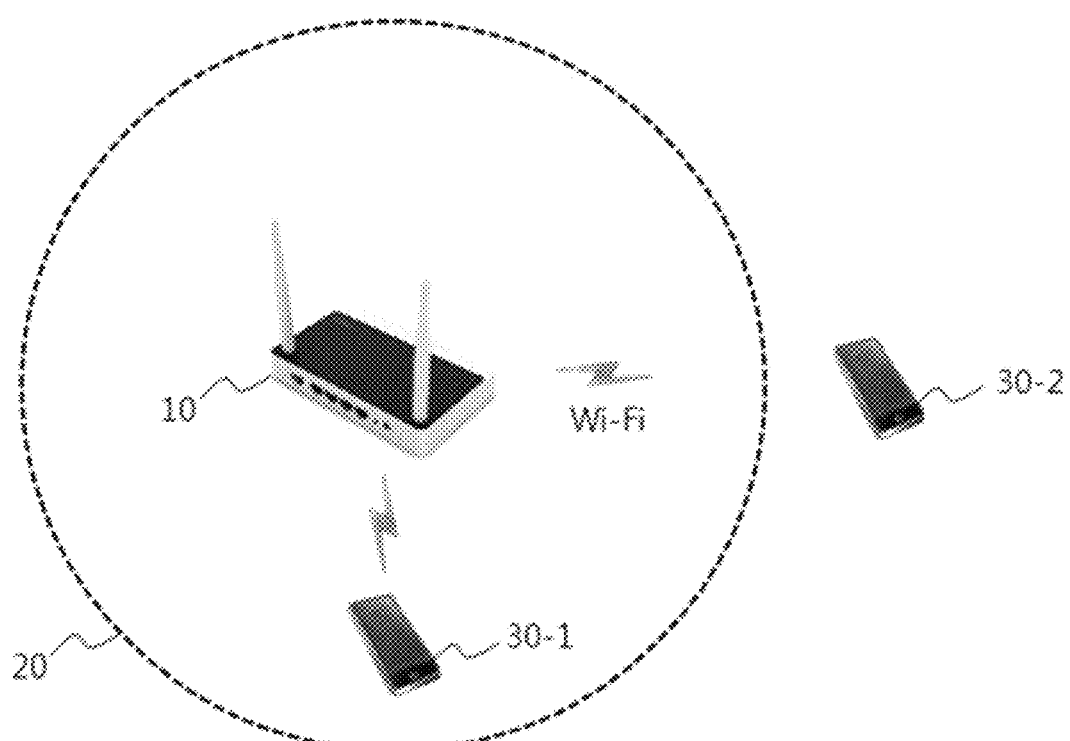
FIG. 1 is a diagram illustrating a configuration of a wireless LAN connection system according to an embodiment of the invention.

The invention can be modified in various forms and specific embodiments will be described and shown below. However, the embodiments are not intended to limit the invention, but it should be understood that the invention includes all the modifications, equivalents, and replacements belonging to the concept and the technical scope of the invention.

Hereinafter, embodiments of the invention will be described in detail with reference to the accompanying drawings. In describing the invention with reference to the accompanying drawings, like elements are referenced by like reference numerals or signs regardless of the drawing numbers and description thereof is not repeated.

FIG. 1 is a diagram illustrating a configuration of a wireless LAN connection system according to an embodiment of the invention.

Referring to FIG. 1, an access point 10 communicates with terminals 30-1 and 30-2 (hereinafter, genetically referred to as terminals 30) by transmitting and receiving wireless signals (such as Wi-Fi signals: Wi-Fi is assumed in the following description). The access point 10 connected to the Internet network assigns communication resources to the connected terminals 30 and the terminals 3 can perform communication using the Internet network via the access point.

Particularly, the access point 10 in this embodiment distinguishes the terminals 30 using strength of signals (hereinafter, referred to as wireless signal strength) wirelessly received from the terminals 30.

The wireless signal strength may vary depending on various conditions (such as distances and obstacles). For example, as illustrated in the drawing, the first terminal 30-1 which is present within a boundary 20 of a predetermined distance is closer to the access point 10 than the second terminal 30-2 and thus has greater wireless signal strength. That is, the access point 10 receives a signal having greater wireless signal strength from the first terminal 30-1 than the second terminal 30-2.

Using this wireless signal strength, the access point 10 gives a connection authority for allowing use of communication resources to only a specific terminal.

Basically, the access point 10 permits connection of terminals having had wireless signal strength equal to or greater than a threshold and forbids connection of the other terminals.

A terminal connection processing method in the access point 10 will be described below in more detail.

Figure 2:
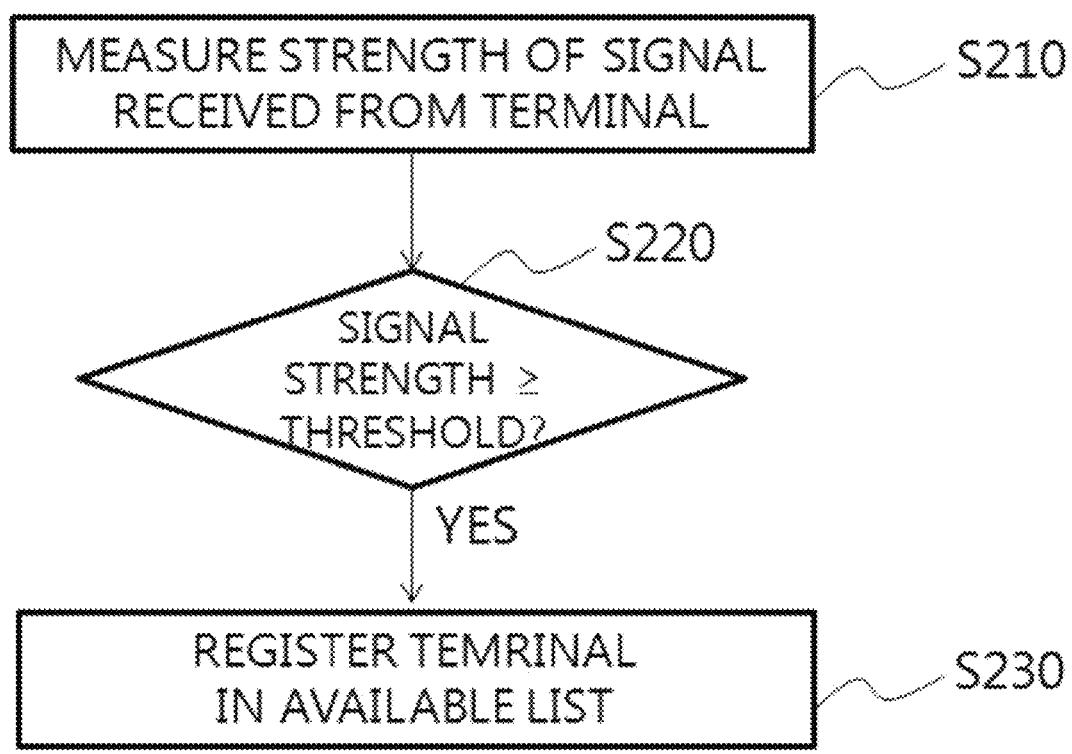
FIG. 2 is a flowchart illustrating a flow of an available list constructing process which is performed by an access point according to an embodiment of the invention.

FIG. 2 is a flowchart illustrating a flow of an available list constructing process which is performed by an access point according to an embodiment of the invention.

Referring to FIG. 2, the access point 10 measures wireless signal strength of signals received from the terminals 30 (S210) and determines whether the measured wireless signal strength is equal to or greater than a predetermined threshold (S220). For example, a received signal strength indication (RSSI) can be used as the wireless signal strength, which is obvious to those skilled in the art, and detailed description thereof will not be made.

A predetermined fixed value may be used as the threshold. In another example, the threshold may be set to be variable such as a predetermined ratio (for example, 80%) of the highest wireless signal strength measured in a predetermined period.

When it is determined in S220 that a signal from a terminal 30 has wireless signal strength equal to or greater than the threshold, the access point 10 registers the terminal 30 in an available list (S230). The access point 10 can store the available list in a memory thereof, or may store the available list in an external device (a computer which can communicate by Wi-Fi or a server connected thereto via the Internet network) which can communicate therewith.

According to this embodiment, the terminals 30 having wireless signal strength equal to or greater than the threshold are registered in the available list. For example, the terminal 30-1 which is present within the boundary 20 illustrated in FIG. 1 is close to the access point 10, has wireless signal strength equal to or greater than the threshold, and thus is registered in the available list. For example, MAC addresses can be used as identification information of the terminals 30 registered in the available list, but the identification information is not limited to the MAC addresses.

The access point 10 distinguishes the terminals within an effective Wi-Fi coverage using the information of the available list and assigns resources to the terminals. For example, the access point 10 permits connection of only the terminals registered in the available list and assigns communication resources to only the terminals.

The access point 10 may periodically reconfigure the available list based on a predetermined rule (for example, a predetermined time period such as a day or a week).

The terminal connection process using the available list will be described below.

Figure 3:
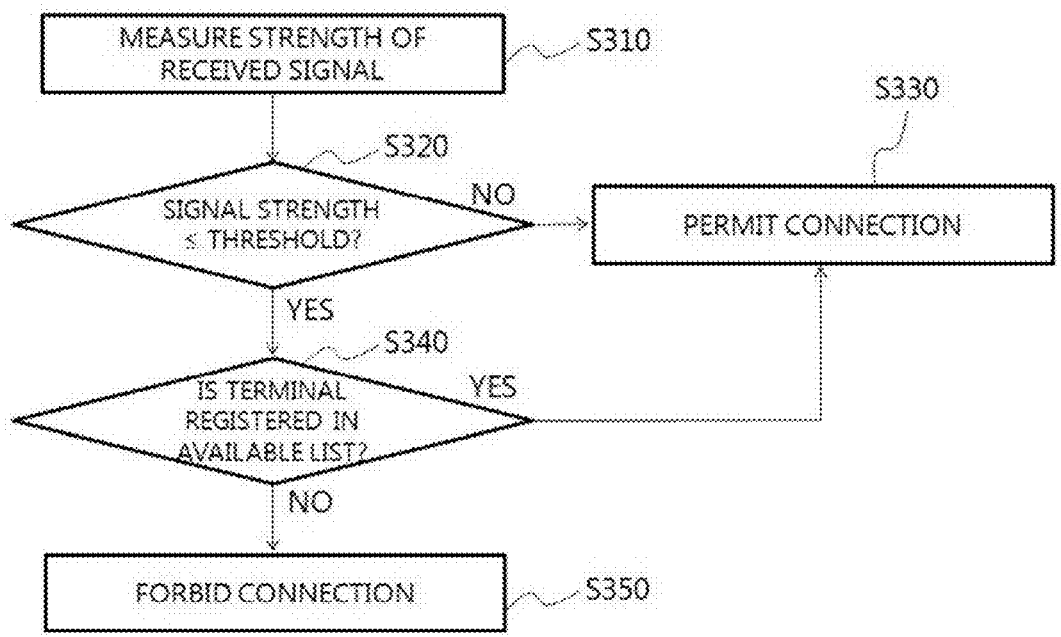
FIGS. 3 and 4 are flowcharts illustrating a flow of a wireless LAN connection process using signal strength according to embodiments of the invention.
Figure 4:
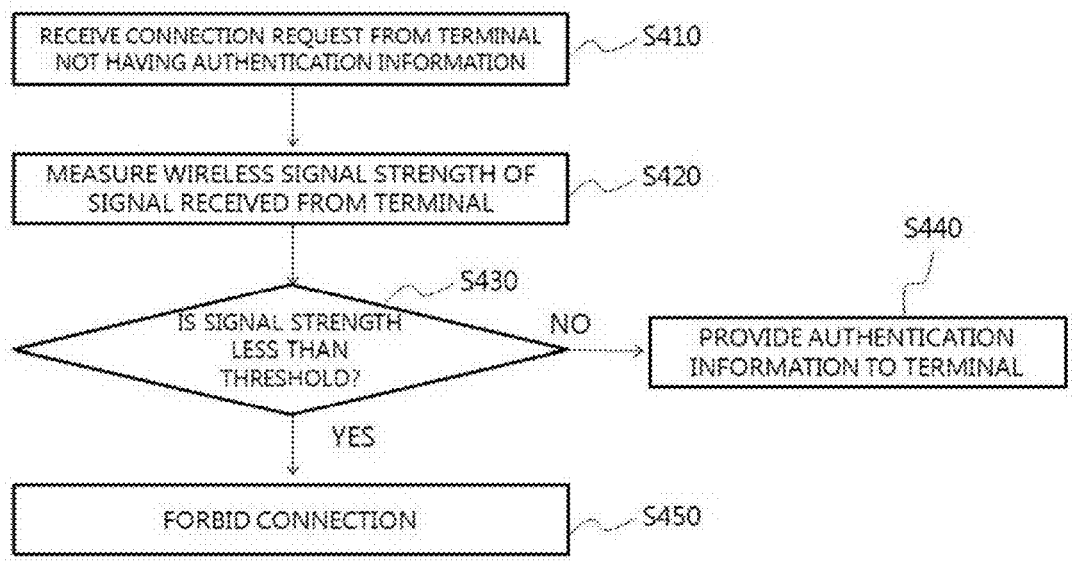

FIGS. 3 and 4 are flowcharts illustrating the wireless LAN connection process using wireless signal strength according to embodiments of the present invention.

Referring to FIG. 3, the access point 10 measures wireless signal strength of a signal received from a terminal 30 (S310) and determines whether the measured wireless signal strength is less than a predetermined threshold (S320).

The access point 10 permits connection of the terminal 30 when the wireless signal strength is equal to or greater than the threshold (S330), and determines whether the terminal 30 is registered in the available list when the wireless signal strength is less than the threshold (S340).

When the terminal 30 is registered in the available list, the terminal 30 is a terminal close to the access point 10 to have wireless signal strength equal to or greater than the threshold and thus connection of the terminal 30 is permitted (S330).

When the terminal 30 is not registered in the available list, connection of the terminal is forbidden (S350). Accordingly, by permitting connection of only the terminals 30 having wireless signal strength equal to or greater than the threshold, connection of terminals not having had wireless signal strength equal to or greater than the threshold can be forbidden. According to this embodiment, it is possible to keep security and to permit connection of only specific terminals without setting authentication information such as a password. Inconvenience that a user of the terminal 30 should memorize and input a password can be solved.

According to the above-mentioned embodiments, the access point 10 sets and stores the available list. In another embodiment, authentication information may be set without using the available list and connection of only specific terminals may be permitted using the wireless signal strength of the terminals 30. This embodiment will be described below with reference to FIG. 4.

Referring to FIG. 4, when a connection request is received from a terminal 30 not having authentication information (S410), the access point 10 measures the wireless signal strength of a signal from the terminal 30 (S420) and determines whether the measured wireless signal strength is equal to or greater than a threshold (S430).

When the measured wireless signal strength is less than the threshold, the access point 10 forbids connection of the terminal 30 (S450). For example, the access point 10 may further perform an authentication procedure using the available list as described above with reference to FIG. 3.

When it is determined in S430 that the measured wireless signal strength is equal to or greater than the threshold, the access point 10 provides authentication information to the terminal 30 (S430). Accordingly, the terminal 30 can access the access point 10 using the authentication information and can use the communication resources.

For example, the access point 10 may periodically change the authentication information based on a predetermined rule in order to cope with a case in which the authentication information is transmitted to unjust terminals. For example, the authentication information may be changed every predetermined time (such as a week or a month) or may be changed every predetermined traffic (such as traffic of 10 gigabytes or 50 gigabytes).

For example, the access point 10 may set up main authentication information which is changed by only an administrator and auxiliary authentication information which is provided to terminals 30 as described above, and may periodically change the auxiliary authentication information based a predetermined rule.

The wireless LAN connection method using signal strength according to the invention can be embodied as codes which can be read by a computer on a computer-readable recording medium. Examples of the computer-readable recording medium include all the types of recording mediums on which data readable by a computer system is stored. Examples thereof include a read only memory (ROM), a random access memory (RAM), a magnetic tape, a magnetic disc, a flash memory, and an optical data storage device. The computer-readable recording medium can be distributed in computer systems connected from one another via a computer communication network and can be stored and executed as codes which can be read in a distribution manner.

While exemplary embodiments of the invention have been described above, it will be understood by those skilled in the art that the invention can be modified in various forms without departing from the spirit and scope of the invention described in the appended claims.

What is claimed is:

1. A wireless LAN connection method which is carried out by an access point, the wireless LAN connection method comprising the steps of:
   measuring wireless signal strength of a signal which is received from a terminal having transmitted a connection request;
   storing and holding an available list on terminals having wireless signal strength equal to or greater than a predetermined threshold;
   determining whether the wireless signal strength of the terminal is equal to or greater than the predetermined threshold;
   checking whether the terminal having transmitted the connection request is registered in the available list, which is information on the terminals having had wireless signal strength equal to or greater than the predetermined threshold, when the wireless signal strength of the terminal is less than the predetermined threshold;
   forbidding connection of the terminal to the wireless LAN when the terminal is not registered in the available list and the wireless signal strength of the signal received from the terminal is less than the predetermined threshold; and
   permitting connection of the terminal to the wireless LAN only when the terminal is registered in the available list and the wireless signal strength of the signal received from the terminal is less than the predetermined threshold.

2. The wireless LAN connection method according to claim 1, wherein the available list is periodically reconfigured based on a predetermined rule.

\* \* \* \* \*